Jan. 27, 1970 J. J. ECKL 3,492,512

PULSE GENERATING FIRING AND SAFETY CIRCUIT FOR PHASE CONTROLLED SILICON CONTROLLED RECTIFIERS

Filed March 8, 1966

INVENTOR.
JAMES J. ECKL
BY Harold J. Rathbun
& William H. Schmelling

United States Patent Office 3,492,512

Patented Jan. 27, 1970

3,492,512

PULSE GENERATING FIRING AND SAFETY CIRCUIT FOR PHASE CONTROLLED SILICON CONTROLLED RECTIFIERS

James J. Eckl, Milwaukee, Wis., assignor to Square D Company, Park Ridge, Ill., a corporation of Michigan Filed Mar. 8, 1966, Ser. No. 532,710
Int. Cl. H03k 3/26
U.S. Cl. 307—305 7 Claims

ABSTRACT OF THE DISCLOSURE

A firing circuit for silicon controlled rectifiers that are connected to supply controlled portions of each half cycle of alternating current to a load. The circuit includes means for supplying repetitive trains of firing pulses to the gates of the rectifiers with the frequency of the pulses being much higher than the frequency of the current source when trains of pulses are initiated at a preselected angular position on successive voltage waves of the source and terminated at a preselected point on the voltage wave just prior to the respective zero points on the voltage wave. The circuit also includes means which are responsive to the magnitude of the current flow through the load which will cause the firing pulses to cease when excess current flow through the load would cause damage to the rectifiers.

This invention relates generally to firing circuits for semiconductor controlled rectifiers and the like, and more particularly to a firing circuit which supplies an adjustably phase-positioned train of high frequency voltage pulses between the control gate and the cathode of a semiconductor controlled rectifier continuously throughout substantially the entire portion of each half cycle of an alternating current source during which the rectifier is or is to be conducting.

When a pair of semiconductor controlled rectifiers are arranged to conduct during a portion of each successive positive and negative half cycle of an alternating current source, it is desirable to initiate the conduction of both rectifiers precisely at the same preselected angle in their respective conducting half cycles. Firing circuits providing such accurate and wide-range control of the conduction of semiconductor rectifiers have been used in resistance welding applications wherein the rectifiers are connected in inverse parallel to supply current from an alternating source to a transformer of a resistance welder. However, it has been found that occasionally one rectifier of the pair fails to conduct properly because of variations in the characteristics of the rectifiers or other causes. When this happens, one of the rectifiers conducts a greater amount of current than the other. This results in the core of the transformer being driven toward saturation by the unidirectional component of current supplied through the imbalanced rectifiers. The consequent reduction in transformer impedance causes each successive half cycle of current supplied to the transformer through the rectifier which is conducting the most current to be greater than the preceding half cycle and results, after a few half cycles, in dastruction of the more freely conducting one of the rectifiers if adequate overcurrent protection is not provided.

Because a semiconductor controlled rectifier, such as a silicon controlled rectifier, under certain conditions may fail to conduct upon the application of a single firing pulse, a firing signal in the form of several rapidly repeated pulses may be used to increase the probability of firing. An arrangement for producing this result is disclosed in my U.S. Letters Patent, No. 3,315,098 issued Apr. 17, 1967, and has been used successfully. However, the firing circuit of the present invention provides improved control of the firing of the rectifiers by supplying trains of high frequency voltage pulses at the respective firing gates of a pair of rectifiers continuously substantially throughout the entire portion of each half cycle of a source of alternating current during which one or the other of the rectifiers is or is to be conducting. Thus, a firing circuit according to the present invention which supplies trains of different numbers of pulses according to the variable duration of the conducting portions of the half cycles is to be distinguished from a firing circuit which supplies a preselected number of pulses unrelated to the size of the conducting portion of the half cycle as in my copending application.

By so increasing the probability of the proper firing of both rectifiers, the possibility of rectifier destruction previously mentioned is greatly reduced. To further insure against rectifier destruction, a firing circuit according to my invention includes means which monitors the current flowing through the rectifiers to a load and causes cessation of the firing pulses on the gates of the rectifiers immediately upon an increase in the load current to a value which if continued would cause destruction of the rectifiers.

It is an object of this invention to provide an improved firing circuit for a semiconductor device such as a semiconductor controlled rectifier.

Another object is to provide an improved firing circuit particularly suitable for the control of a semiconductor controlled rectifier and operative to provide an output in the form of repetitive trains of discrete voltage pulses.

Another object is to provide an improved firing circuit particularly suitable for the control of a semiconductor controlled rectifier and operative to provide an output in the form of repetitive trains of discrete voltage pulses and including means for initiating each train at a preselected point on the voltage wave of an alternating current source and to continue the train until just prior to the next reversal in polarity of the voltage wave.

A further object is to provide a firing circuit for an electronic device including an improved protective circuit for the device.

Another object is to provide an improved firing circuit for supplying firing pulses to an electronic device in which an electronic device to be fired is protected from overload by monitoring the current through the device and causing the firing pulses to cease upon an excessive current flow through the device.

Further objects and advantages will become apparent from the following specification wherein reference is made to the drawings, in which.

Figure 1:
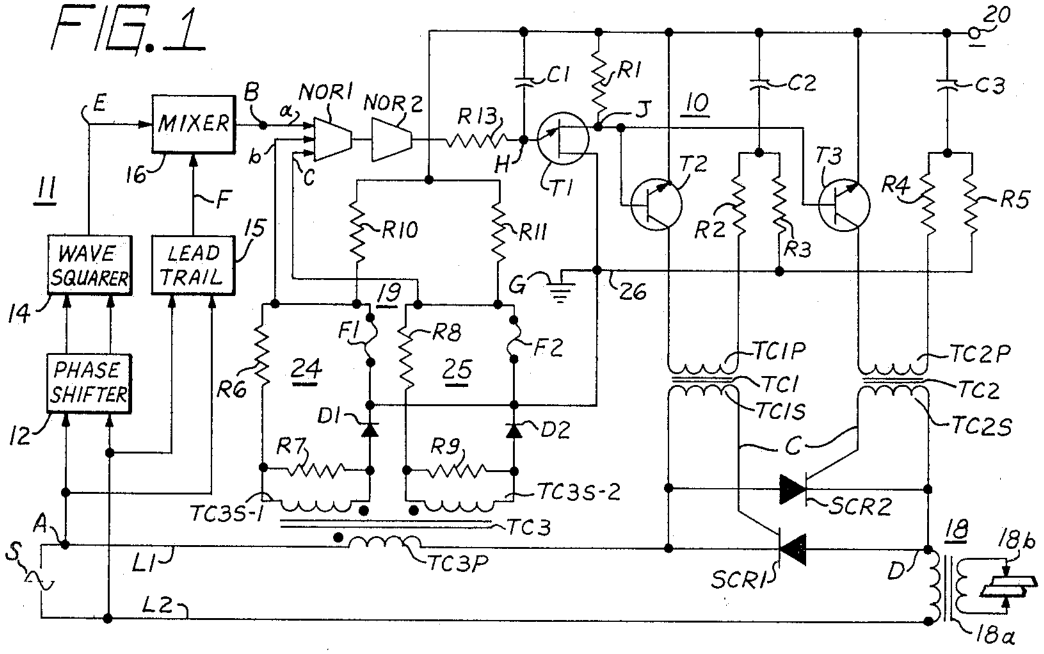
FIG. 1 is an elementary wiring diagram of an embodiment of the invention.

Referring to FIG. 1, a rectifier firing circuit in accordance with this invention has a pulse supply or firing control portion 10 connected to receive an input signal from an input portion 11 and to provide outputs at a pair of transformers TC1 and TC2. The input portion 11 comprises a phase shifter section 12, a wave-squarer section 14, a lead-trail section 15, and a mixer section 16. The sections 12, 14, 15, and 16 provide respective signals as hereinafter described, and the nature of each for its specific purpose is well known to those skilled in the art to which the present invention pertains.

The output transformers TC1 and TC2 are arranged to supply control signals to respective semiconductor controlled rectifiers SCR1 and SCR2, preferably silicon controlled rectifiers, connected in inverse parallel in a supply line L1 of a pair of supply lines L1 and L2 supplying a load from an alternating current source S. In the embodiment shown, the load is a resistance welder 18 having a welding transformer 18*a* and a pair of welding electrodes 18*b*. The source S also supplies the input portion 11 through the lines L1 and L2. Also included in the rectifier firing circuit is a protection portion 19 comprising a current transformer TC3 having a primary winding TC3P connected in the line L1 in series with the load 18.

Figure 2A:
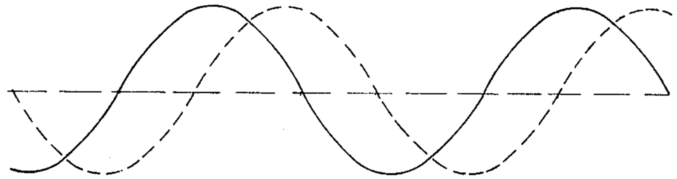
FIG. 2A through FIG. 2F are a series of graphs illustrating the operation of the circuitry of FIG. 1.

The voltage wave of the source S is illustrated by the solid line waveform of FIG. 2A. The graphs of FIG. 2A through 2F show the various waveforms at the like-lettered circuit location in the wiring diagram of FIG. 1.

In addition to the transformers TC1 and TC2, the firing control portion 10 comprises a pair of NOR logic elements NOR 1 and NOR 2 connected to form an OR logic element, a unijunction transistor T1, a pair of NPN transistors T2 and T3, a plurality of capacitors C1, C2, and C3, a plurality of resistors R1 through R5, and a resistor R13. The transformers TC1 and TC2 have respective primary windings TC1P and TC2P and respective secondary windings TC1S and TC2S. The secondary windings TC1S and TC2S are connected to gating circuits of the rectifiers SCR1 and SCR2, respectively, in a conventional manner.

The current transformer TC3 of the overload protection portion 19 has a pair of secondary windings TC3S–1 and TC3S–2 feeding a pair of identical overcurrent responsive circuits 24 and 25. The circuit 24 includes a diode D1, a fuse F1, and a pair of resistors R6 and R7, and the circuit 25 includes a diode D2, a fuse F2, and a pair of resistors R8 and R9. The circuits 24 and 25 are connected to a negative terminal of a direct current source 20 through respective resistors R10 and R11. The source 20 which has its positive terminal connected to a ground G also supplies a negative voltage to the firing control portion 10. A common bus 26 is connected to the ground G.

Figure 2B:
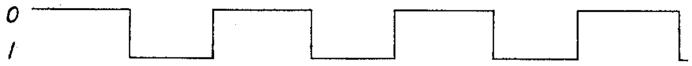

The input portion 11 supplies a voltage signal at a junction B having the waveform indicated in FIG. 2B. The junction B is connected to an input *a* of the NOR 1 which also has inputs *b* and *c*. As will become apparent, a voltage having the waveform of FIG. 2B is the information supplied to the input *a* when it is desired that rectifiers SCR1 and SCR2 are to conduct. The rectifiers SCR1 and SCR2 then normally have impressed on their control gates a voltage having the waveform of FIG. 2C and constituting separate continuous trains of high-frequency pulses. The voltage at the input *a* of the NOR 1 changes from a logic "1" to a logic "0" to initiate conduction of one of the rectifiers SCR1 and SCR2 by starting an initial one of the trains of the pulses of FIG. 2C. Each train of pulses thus initiated continues throughout the balance of its respective half cycle less a margin of a small fraction of the half cycle at the end thereof, for example, five degrees. It is to be understood that the rectifiers SCR1 and SCR2 will continue to conduct for the remainder of their conductive half-cycles after cessation of the firing pulses and, because of the inductance of the load 18, also for a short period after the voltage of the source 9 has passed through zero.

Figure 2C:
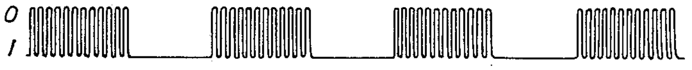

The conduction information of the waveform of FIG. 2B is developed in the input device 11 by the cooperation of its component sections 12, 14, and 16. The phase-shifter section 12 is adjusted, either manually or by other means, to displace its alternating output voltage waveform by a phase angle of a predetermined number of degrees with respect to the solid-line voltage wave of FIG. 2A. In the welder controller shown, the phase-shifter section 12 thus provides a heat control function. The shifted waveform is shown by broken lines in FIG. 2A, and its displacement angle represents the amount of desired time delay, at the beginning of each half cycle, before each of the trains of firing pulses of FIG. 2C is initiated. Each train of pulses then continues throughout the remainder of its associated half cycle of the solid-line, undisplaced waveform of FIG. 2A except for a brief interval at the end of each half cycle.

Figure 2D:
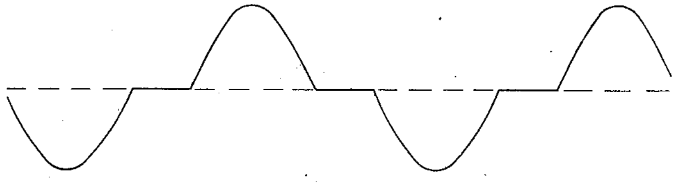
Figure 2E:

The output of the phase-shifter section 12 is impressed as an input to the wave-squarer section 14. The output of the wave-squarer section 14 as shown by the waveform of FIG. 2E is a logic "1" whenever the displaced waveform of the input to the wave-squarer section 14 developed by ahe phase-shifter section 12 is positive and a logic "0" whenever the input to the wave-squarer section is negative.

Figure 2F:
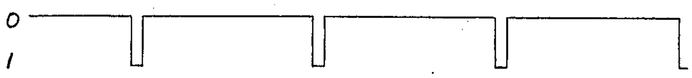

The lead-trial section 15 is fed directly from the supply conductors L1 and L2 and squares and rectifies the solid-line waveform of FIG. 2A to provide an output having the waveform of FIG. 2F. The output of the section 15 at the point F is a logic "0" whenever the actual supply line voltage at the junction A is non-zero except for a small fraction of a half cycle preferably about five degrees, immediately before and after and during each of the zero points on the waveform of FIG. 2A, when the output at the junction F is a logic "1."

The mixer section 16 combines the outputs of the wave-squarer section 14 and the lead-trail section 15 and furnishes at its output the waveform of FIG. 2B which is the conduction information. It will be noted that the output of the mixer section 16, i.e., the waveform of FIG. 2B, goes from a logic "0" to a logic "1" whenever the output of the lead-trail section 15 changes from a logic "0" to a logic "1." The output of the mixer section 16 thereafter remains a logic "1" until it changes to a logic "0" as a result of the output of the wave-squarer section 14 changing from either a logic "0" to a logic "1," or from a logic "1" to a logic "0."

The two remaining inputs *b* and *c* of the NOR 1 are fed by the outputs of the overload protection circuit portion 19 and normally have a logic "0" impressed thereon. When it is required, for the purpose of overload protection, as will be described, to terminate the firing pulses to the rectifiers SCR1 and SCR2, a logic "1" is impressed on at least one of the inputs *b* and *c*. Additional inputs to the NOR 1 (not shown) could be provided to allow other safety parameters to be monitored, such as, for example, the temperature of each of the rectifiers SCR1 and SCR2.

The NOR 2 performs an inversion function so that the NOR 1 and the NOR 2 cooperate to perform the function of a multiple input OR which has an output of logic "0" only when all inputs are at a logic "0."

The output of the NOR 2 is connected through the resistor R13 and a junction H to both the emitter of the unijunction transistor T1 and one side of the capacitor C1. One base lead of the transistor T1 is connected to the ground G through the common bus 26 and the other base lead of the transistor T1 is connected through a junction J to one side of the resistor R1 and to the respective base electrodes of the transistors T2 and T3. The other side of the resistor R1, the other side of the capacitor C1, and the emitters of both transistors T2 and T3 are connected to the negative terminal of the source 20. The collector of the transistor T2 is connected to one terminal of the transformer primary TC1P and the collector of the transistor T3 is connected to one terminal of the transformer primary TC2P. The other terminal of the transformer primary TC1P is connected through the resistor R2 and a capacitor C2 to the negative terminal of the source 20, and the other terminal of the transformer primary TC2P is connected through the resistor R4 and the capacitor C3 to the negative terminal of the source 20. A junction between the resistor R2 and the capacitor C2 is connected through the resistor R3 to the common bus 26 and a junction between the resistor R4 and the capacitor C3 is connected through the resistor R5 and the bus 26.

Operation of the firing control portion 10 to cause the rectifiers SCR1 and SCR2 to receive firing pulses as shown in FIG. 2C upon receipt of logic "0" signals at the inputs *a*, *b* and *c* of the NOR1 will now be explained in detail. Since, in the system of logic used herein for descriptive purposes, a logic "0" is the voltage of the ground G and common bus 26, when a logic "0" signal appears at the junction H as a result of a logic "0" signal at the junction B, the capacitor C1 charges very rapidly through the resistor R13 and a ground connection (not shown) of the NOR 2. When the charge on the capacitor C1 reaches a value determined by the intrinsic stand-off ratio of the unijunction transistor T1, the transistor T1 switches to its conductive state discharging the capacitor C1 through the resistor R1 and causing a positive pulse having a steep wavefront to appear at the base electrodes of the transistors T2 and T3. Further explanation of the firing control portion 10 of the firing circuit will be limited to the circuitry of the transistor T2 and its associated rectifier SCR1, it being understood that the circuitry including the transistor T3 and its associated rectifier SCR2 is identical.

The positive pulse which appears at the base of the transistor T2 causes the transistor T2 to conduct. The conducting transistor T2 provides a discharge circuit for the capacitor C2 through the resistor R2 and the primary winding TC1P, and provides a path for current to flow from the bus 26 through the resistors R3 and R2 and the primary winding TC1P. The conduction of the transistor T2 thus causes the secondary winding TC1S to supply an output signal between the gate and cathode of the rectifier SCR1 which then normally switches to a conductive state.

When the transistor T1 is non-conductive, the signal at the base of the transistor T2 is a logic "1" thus biasing the transistor T2 against conduction. The charge on the capacitor C2 is formed during the interval when the transistors T1 and T2 are non-conductive through a circuit which includes the resistor R3 and the capacitor C2. When the transistors T1 and T2 are conducting, the rapid discharge of the capacitor C1 through the transistor T1 and the resistor R1 causes the transistor T1 to return to its non-conductive state, whereupon the charge on the capacitor C1 rapidly reforms through the resistor R13 so long as there is a logic "0" at the junction H. Thus the transistor T1 operates as a conventional relaxation oscillator as long as there is a logic "0" at the junction H.

From the foregoing, it is apparent that the gate to cathode circuit of the rectifier SCR1 receives a train of voltage pulses as shown in FIG. 2C which is initiated upon the signal at the junction H changing from a logic "1" to a logic "0" during a half cycle of the wave having the solid-line waveform of FIG. 2A, as determined by adjustment of the phase-shifter section 15, and which continues throughout the remainder of the half cycle less a brief interval at the end of the half cycle, the start of the interval being determined by a change in the signal at the output of the lead-trail section 15 from a logic "0" to a logic "1."

It will be seen that the transistor T3 operates in the same fashion as the transistor T2, with the capacitor C3 functioning the same as the capacitor C2, the resistor R4 the same as the resistor R2, the resistor R5 the same as the resistor R3, the transformer TC2 the same as the transformer TC1, and the rectifier SCR2 the same as the rectifier SCR1. Hence, repetitive trains of voltage pulses are supplied to the control electrodes of both of the rectifiers SCR1 and SCR2 causing the current supplied by the rectifiers SCR1 and SCR2 to the load 18 to be as shown by the waveform of FIG. 2D.

Referring now to the overload protection portion 19, it will be noted that the secondary windings TC3S–1 and TC3S–2 have mutually opposite polarities so that their associated circuits 24 and 25 conduct during alternate half cycles. Because the circuits associated with the windings TC3S–1 and TC3S–2, respectively, are identical, only the circuit including the winding TC3S–1 will be described in detail.

The winding TC3S–1 is loaded with the resistor R7 in parallel with a series circuit made up of the resistor R6, the fuse F1, and the diode D1. The input *b* of the NOR 1 is connected to the negative terminal of the source 20 through the resistor R10 and to the common bus 26 through the fuse F1.

During normal operation, when the fuse F1 is not burned out, the input *b* of the NOR 1 is maintained at the potential of the common bus 26 through the fuse F1 so that a logic "0" signal is impressed thereon. In the event that an excess current of one polarity flows through the transformer winding TC3P, the current output of the secondary winding TC3S–1 becomes excessive. If the excess current recurs for a number of half cycles, the fuse F1 burns out. When the fuse F1 burns out, the voltage at the input *b* of the NOR 1 changes from a logic "0" signal to a logic "1" signal, the logic "1" signal being fed from the negative terminal of the source 20 through the resistor R10 and causing the signal at the junction H to shift from a logic "0" to a logic "1" thereby terminating the conduction of the rectifiers SCR1 and SCR2.

Similarly, the input *c* of the NOR 1 is connected to the negative terminal of the source 20 through the resistor R11 and to the common bus 26 through the fuse F2. In the event that a similarly excessive current of the other polarity flows through the primary TC3P, the fuse F2 responds and causes the input *c* of the NOR 1 to change from a logic "0" to a logic "1" to similarly terminate the conduction of the rectifiers SCR1 and SCR2. The thermal characteristics of the fuses F1 and F2 and the rectifiers SCR1 and SCR2 are matched so that the fuses melt before the respective rectifiers can be damaged by recurrent excessive current pulses.

As is obvious from the circuit disclosed in my U.S. Patent No. 3,315,098 identified hereinbefore, each of a pair of controlled rectifiers may be switched to a conductive state by a few, for example, three or four, rapidly repeated firing pulses supplied by a pair of transformer windings to the gates of the rectifiers at a preselected angle during each half cycle. When this arrangement is used with the power factor potentiometer incorrectly adjusted and the heat control adjusted so that the pair of rectifiers are required to conduct early in each half cycle, frequently the conduction of the lead rectifier which initially conducts continues in time to a point which is later than the point in time when the last firing pulse is applied to the gate of the trail rectifier because of the inductive characteristics of the welding transformer. Thus the trail rectifier fails to switch to a conductive state and the flux in the iron of the transformer moves toward saturation so that when the lead rectifier again conducts on a succeeding half cycle, an abnormally high current flows and continues to flow and again prevents the trail rectifier from switching to a conductive state. This operation continues until the lead rectifier is destroyed. In a circuit according to the present invention, because the firing pulses to the gates of the rectifiers are closely spaced and continue from the instant of firing, as determined by the heat control setting, throughout substantially the remainder of each half cycle, it is not possible for the conduction of the lead rectifier to prevent the trail rectifier from conducting. Thus, the system conducts alternate current half cycles without driving the transformer toward saturation.

When a semiconductor device, such as a silicon controlled rectifier, is applied in such a manner that the maximum allowable peak junction temperature is not exceeded at any time, the device is said to be applied on a recurrent basis. Also, semiconductors may be subject to nonrecurrent fault conditions without destruction in spite of the fact that the maximum operating temperature of the device is exceeded for a brief interval. The specification of most manufacturers of these devices give ratings for both recurrent and non-recurrent operation of the devices in terms of surge current and $I^2t$. Further, the nonrecurrent ratings apply to conditions that will not occur more than a limited number of times during the operating life of the semiconductor and for most silicon controlled rectifiers this number of times is in the order of one hundred to several hundred times. Operation beyond this point may result in permanent degradation of the characteristics of the device. A circuit according to this invention, by maintaining the flux level in the welding transformer well below saturation during normal operating conditions, minimizes the possibilities of the occurrence of non-recurrent faults and the accompanying destruction of the rectifiers.

Optimum circuit design usually requires that the rectifiers used in circuits of the type herein described be capable of operating as close as possible to their maximum recurrent ratings without injury to the rectifiers or loss of their control characteristics. To aid in the design of semiconductor circuits, manufacturers provide data which permit curves to be drawn showing the maximum values of the current for a given time period that the semiconductor may conduct under recurrent operation. Similarly, the data furnished by fuse manufacturers contains information showing the values of current and time of current flow required for the fuse to interrupt a circuit. Thus when the fuses F1 and F2 are properly selected, the curves of the rectifiers SCR1 and SCR2 and fuses F1 and F2 are substantially identical and the rectifiers SCR1 and SCR2 operate under their maximum capabilities without injury.

Conventionally, silicon controlled rectifiers are protected by fuses interposed in their anode to cathode circuits. When this arrangement is used, relatively large and expensive fuses are required. In contrast, in the circuit according to the present invention, small inexpensive fuses are used which may be readily replaced at low cost when the circuit is operated improperly. Conventionally, resistance welder controllers are provided with adjustments for varying both the amount of current flow, called heat control, and the time interval during which the welding current flows. This arrangement is provided so the welder is capable of welding a great variety of different types and gages of metal. To accommodate these requirements, welder controllers are designed so that if the adjustments are made for both a maximum current and maximum time, the controlled rectifiers controlling the current flow to the welding transformer are required to operate in excess of their maximum recurrent rating.

When the circuit according to my invention is required to provide the maximum current for a maximum time, one or the other of the fuses F1 or F2 will burn out and cause the protective portion 19 to operate as previously described. Thus the conduction of the rectifiers SCR1 and SCR2 is stopped before injury to the rectifiers occurs. It is apparent that replacement of one or both of the inexpensive fuses F1 and F2 restores the circuit to operation at a low cost in contrast to the material cost which occurs when a fuse in the anode circuit of a controlled rectifier must be replaced.

Another advantage of the circuit of this invention resides in the separate firing circuits which are provided for the rectifiers SCR1 and SCR2. As previously described, when the unijunction transistor T1 conducts, both of the transistors T2 and T3 conduct, causing the charge on the capacitor C2 to be delivered to the primary winding TC1P, and the charge on the capacitor C3 to be delivered through the winding TC2P. Additionally, when both transistors T2 and T3 conduct, current is respectively delivered through the resistors R3 and R5 to the windings TC1P and TC2P. Thus the transistors T2 and T3 act as amplifiers of the firing signal provided by the unijunction transistor T1. Additionally, the gate to cathode circuits of the rectifiers SCR1 and SCR2 each receive firing signals from the individual transformers TC1 and TC2. This arrangement insures that even if the gate to cathode impedances of the rectifiers SCR1 and SCR2 are unequal, each receives firing pulses of sufficient magnitude to switch to its conductive state. This circuit possesses an advantage over a more conventional circuit wherein the firing pulse of a unijunction transistor T1 is transmitted through a single transistor amplifier to a transformer having a single primary winding and dual secondary windings connected to two controlled rectifiers. When such a dual secondary and single primary winding arrangement is used with a pair of rectifiers having unequal gate to cathode impedances, the output of the secondary windings of the transformer become unbalanced and the rectifier which has the greater impedance receives firing pulses of insufficient magnitude to switch it to its conductive state.

I claim:

1. A firing circuit for a semiconductor device having a control electrode connected to control a load supplied from an alternating current source, said circuit comprising: a phase-shifting and wave-squaring means connected to the source for providing an alternating square wave output signal of the same frequency as the source and adjustably displaced in phase from the phase of the source, a lead-trail means connected to the source for providing an output voltage signal during the interval that the voltage of said alternating current source is passing through zero, a mixer means supplied by the outputs of the phase-shifting means and by the lead-trail means for providing one logic output signal at approximately the instant the output signal of the lead-trail means begins and continues to supply said one logic signal until the output signal of the wave squarer changes from one voltage level to a second voltage level at which time the mixer supplies an output logic signal that is different than the said one logic output signal, an OR logic unit having an input gate connected to receive the output signal from the mixer means and providing an output signal change in response to the change in the output signal change of the mixer means, and pulse supply means having an input connected to receive the output signal from the OR logic unit for supplying repetitive trains of voltage pulses to the control electrode during each interval the mixer means supplies the said one logic output signal with said voltage pulses of each train having a frequency much higher than the frequency of the source and being initiated at a preselected annular position on successive voltage waves of the source and terminated at a preselected point on said voltage wave just prior to respective zero points on said voltage wave.

2. A firing circuit in accordance with claim 1 characterized in that said OR logic unit comprises a pair of NOR logic units, one of said NOR logic units having its input gate connected to receive signals from the input supply means.

3. A firing circuit in accordance with claim 1 characterized in that said OR logic unit has a second input gate, means responsive to the current supplied to the load are provided and normally supply a voltage signal of said second value to said second input gate, said means including means operative to supply a voltage signal of said first value to said second input gate when the current becomes excessive.

4. A firing circuit in accordance with claim 3 characterized in that said current responsive means comprises a loop circuit carrying a current directly related to the current in the load circuit, an overload responsive device in said loop circuit which opens said loop circuit upon said load current becoming excessive and remaining excessive for a predetermined time, and said means operative to supply a voltage signal of said first value to said second input gate becomes operative upon opening of said loop circuit.

5. A firing circuit for a semiconductor device having a control electrode and connected to control a load supplied from an alternating current source, said circuit comprising an OR logic unit, a pulse supply means responsive to a predetermined output signal from said OR logic unit to supply a pulsating firing signal to said control electrode, said OR logic unit having a pair of inputs, an input supply means, one of said inputs being supplied from said input supply means thereby to cause said predetermined output signal to appear at said OR logic unit, and means responsive to the magnitude of the current flowing to the load to change the signal at the other of said inputs thereby to prevent said predetermined signal to appear at said OR logic unit.

6. A firing circuit in accordance with claim 5 characterized in that said means responsive to the magnitude of the load current has a recurrent overload characteristic matched with the recurrent overload characteristic of the semiconductor device.

7. A controlled semiconductor device and a firing circuit therefor comprising a controlled semiconductor device connected between an alternating current source and a load, pulse-generating means having an input and an output and operative to provide a train of high frequency pulses at its output when a signal of a first voltage level zero is impressed on its input and to discontinue said train of pulses when a signal of a second voltage level is impressed on its input, means connecting said output to the control gate of said semiconductor device, and input means for impressing said signals of said first voltage level and said second voltage level on said input repetitively, said input means comprising phase-shifting and wave-squaring means providing an alternating square-wave output of the same frequency as said source but displaced in phase from the phase of said source, a lead-trail device connected to said source and providing an output pulse during the interval that the voltage of said alternating current source is passing through zero, a mixer supplied by said phase-shifting and wave-squaring means and by said lead-trail device providing a voltage of said first level at the instant the output pulse of the lead-trail device starts and continuing until the output of the wave squarer changes from one voltage level to a second voltage level, and means including an OR logic unit for supplying the output of said mixer to the input of said pulse-generating means.

References Cited

UNITED STATES PATENTS

| | | | |
|---|---|---|---|
| 3,315,098 | 4/1967 | Eckl | 307—252 |
| 3,354,377 | 11/1967 | Leeds | 307—252 X |
| 3,383,623 | 5/1968 | Vercellotti et al. | 307—252 X |
| 3,387,112 | 6/1968 | Guettel | 307—252 X |
| 3,397,344 | 8/1968 | Skirpan | 307—252 X |

DONALD D. FORRER, Primary Examiner

R. C. WOODBRIDGE, Assistant Examiner

U.S. Cl. X.R.

307—202, 252, 261, 262